US012779817B2

(12) United States Patent
Lee et al.

(10) Patent No.: US 12,779,817 B2
(45) Date of Patent: Nov. 3, 2026

(54) LIGHT REFLECTIVE RESIN FILM AND METHOD OF MANUFACTURING THE SAME

(71) Applicant: SKC CO., LTD., Gyeonggi-do (KR)

(72) Inventors: Jang Won Lee, Gyeonggi-do (KR); Li Min Chun, Gyeonggi-do (KR); Yong Deuk Kim, Gyeonggi-do (KR)

(73) Assignee: Microworks Co. Ltd., Chungcheongbuk-do (KR)

( * ) Notice: Subject to any disclaimer, the term of this patent is extended or adjusted under 35 U.S.C. 154(b) by 1057 days.

(21) Appl. No.: 17/706,153

(22) Filed: Mar. 28, 2022

(65) Prior Publication Data

US 2022/0317514 A1 Oct. 6, 2022

(30) Foreign Application Priority Data

Apr. 6, 2021 (KR) ........................ 10-2021-0044711
Apr. 6, 2021 (KR) ........................ 10-2021-0044712

(51) Int. Cl.

| | |
|---|---|
| ***B32B 7/027*** | (2019.01) |
| ***B32B 7/023*** | (2019.01) |
| ***B32B 27/08*** | (2006.01) |
| ***B32B 27/30*** | (2006.01) |

(Continued)

(52) U.S. Cl.
CPC .............. *B32B 7/027* (2019.01); *B32B 7/023* (2019.01); *B32B 27/08* (2013.01); *B32B 27/308* (2013.01); *B32B 27/36* (2013.01); *C08J 5/18* (2013.01); *B32B 2250/42* (2013.01); *B32B 2307/306* (2013.01); *B32B 2307/416* (2013.01); *B32B 2307/42* (2013.01); *C08J 2333/12* (2013.01); *C08J 2367/02* (2013.01)

(58) Field of Classification Search
CPC .... C23C 16/46; C23C 16/52; H01L 21/67248
See application file for complete search history.

(56) References Cited

U.S. PATENT DOCUMENTS

| | | | |
|---|---|---|---|
| 2002/0061944 | A1 | 5/2002 | Asrar et al. |
| 2005/0221096 | A1 | 10/2005 | Kliesch et al. |
| 2013/0017382 | A1 | 1/2013 | Woo et al. |

(Continued)

FOREIGN PATENT DOCUMENTS

| | | | |
|---|---|---|---|
| CN | 100586992 | C | 2/2010 |
| CN | 102666093 | B | 9/2014 |

(Continued)

OTHER PUBLICATIONS

Office Action for Germany Patent Application No. 102022108179.6 issued by the Germany Patent Office on Feb. 23, 2026.

(Continued)

*Primary Examiner* — Peter J Macchiarolo
*Assistant Examiner* — Mireille S Sadate-Moualeu
(74) *Attorney, Agent, or Firm* — IP&T GROUP LLP

(57) ABSTRACT

A light reflective resin film includes a reflective stack including a resin layer, and the resin layer has a melting resistance of 2000 MΩ or less. The melting resistance is measured by bringing a copper plate into contact with a resin layer in a molten film state and applying a voltage of 50 V to the copper plate. By improving the energization performance of the resin layer, it is possible to reduce or eliminate the optical pattern in the light reflective resin film.

5 Claims, 2 Drawing Sheets

(51) Int. Cl.

| | |
|---|---|
| ***B32B 27/36*** | (2006.01) |
| ***C08J 5/18*** | (2006.01) |

(56) References Cited

U.S. PATENT DOCUMENTS

| | | | | |
|---|---|---|---|---|
| 2013/0164513 | A1* | 6/2013 | Yoo | B32B 27/30 428/420 |
| 2014/0110043 | A1 | 4/2014 | Wu | |
| 2016/0332424 | A1* | 11/2016 | Yamaguchi | B32B 17/10688 |
| 2017/0329060 | A1* | 11/2017 | Tai | G02B 5/0841 |
| 2019/0369314 | A1 | 12/2019 | Hebrink et al. | |

FOREIGN PATENT DOCUMENTS

| | | | | |
|---|---|---|---|---|
| CN | 111427106 | A | 7/2020 | |
| CN | 111844992 | A | 10/2020 | |
| CN | 112189164 | A * | 1/2021 | B32B 7/022 |
| EP | 1980391 | A1 | 10/2008 | |
| EP | 2070966 | A1 | 6/2009 | |
| EP | 2439229 | A1 | 4/2012 | |
| JP | 2003-075920 | A | 3/2003 | |
| JP | 2005289065 | A * | 10/2005 | C08J 7/18 |
| JP | 2009-012187 | A | 1/2009 | |
| JP | 2010-243581 | A | 10/2010 | |
| JP | 2014-188923 | A | 10/2014 | |
| JP | 2015148666 | A | 8/2015 | |
| JP | 2016081526 | A | 5/2016 | |
| JP | WO2016/136518 | A1 | 12/2017 | |
| JP | 2019-219622 | A | 12/2019 | |
| KR | 10-2002-0053874 | A | 7/2002 | |
| KR | 2003-0012874 | A | 2/2003 | |
| KR | 10-0601228 | B1 | 7/2006 | |
| KR | 20120018008 | A | 2/2012 | |
| KR | 10-2012-0019737 | A | 3/2012 | |
| KR | 10-2016-0131008 | A | 11/2016 | |
| KR | 20190023849 | A | 3/2019 | |
| KR | 10-2019-0037986 | A | 4/2019 | |
| KR | 10-2020547 | B1 | 9/2019 | |
| KR | 10-2020-0087007 | A | 7/2020 | |
| KR | 20200087007 | A * | 7/2020 | |
| TW | I644797 | B | 12/2018 | |
| WO | 01/096104 | A3 | 12/2001 | |
| WO | 2005/096036 | A1 | 10/2005 | |
| WO | 2009096298 | A1 | 8/2009 | |
| WO | 2015/183304 | A1 | 12/2015 | |
| WO | 2019198635 | A1 | 10/2019 | |
| WO | 2020085286 | A1 | 4/2020 | |

OTHER PUBLICATIONS

Notice of Allowance issued by the Korean Patent Office for Application No. 10-2021-0044712, dated Jul. 7, 2023.
Office Action for the Japanese Patent Application No. 2023-166058 issued by the Japanese Patent Office on Apr. 23, 2024.
Office Action for the Chinese Patent Application No. 202210350648.6 issued by the Chinese Patent Office on May 12, 2024.
Combined Search and Examination Report for the British Patent Application No. GB2204581.9 issued by the Intellectual Property Office in UK on Sep. 28, 2022.
Examination Report for the Indian Patent Application No. 202234016131 issued by Intellectual Property India on Oct. 27, 2022.
Office Action for the Japanese Patent Application No. 2022-063042 issued by the Japanese Patent Office on Feb. 21, 2023.
Office Action for the Korean Patent Application No. 10-2021-0044711 issued by the Korean Intellectual Property Office on Feb. 27, 2023.
Office Action for the Taiwanese Patent Application No. 111113057 issued by the Taiwanese Patent Office on Nov. 22, 2022.
Office Action for Korean Patent Application No. 10-2021-0044712 issued by the Korean Patent Office on Jul. 6, 2022.

* cited by examiner

[FIG. 1]
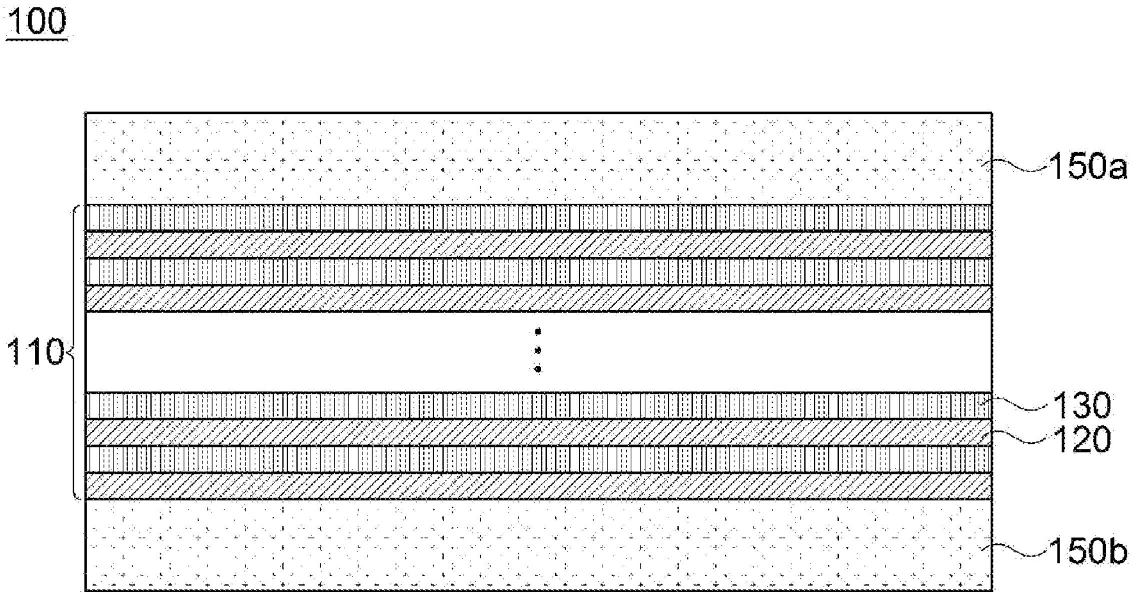
[FIG. 2]
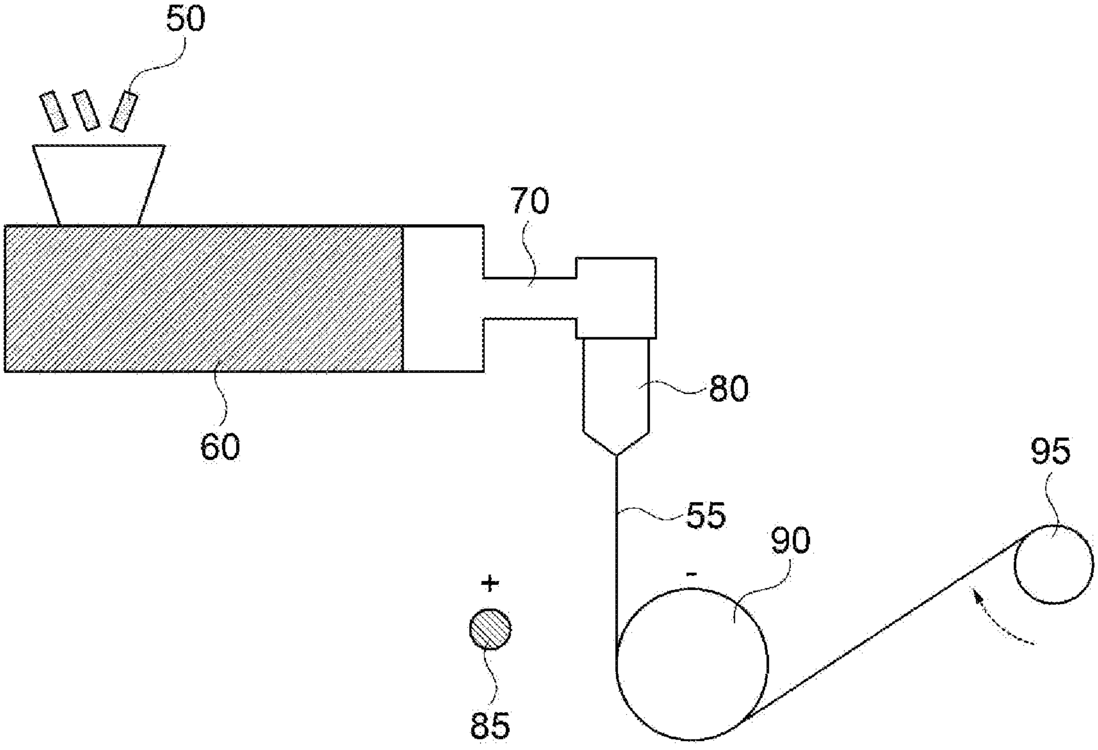

[FIG. 3]
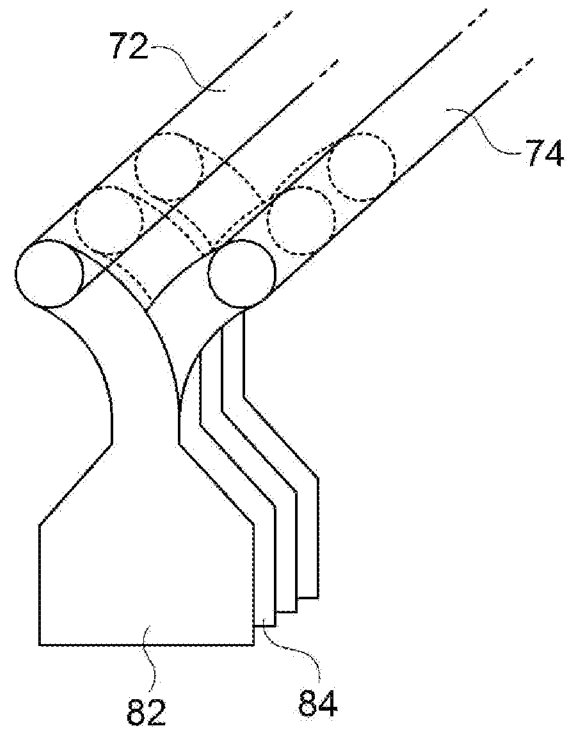

LIGHT REFLECTIVE RESIN FILM AND METHOD OF MANUFACTURING THE SAME

CROSS-REFERENCE TO RELATED APPLICATION(S)

This application claims benefit of priority to Korean Patent Application No. 10-2021-0044712 filed on Apr. 6, 2021 and No. 10-2021-0044711 filed on Apr. 6, 2021 in the Korean Intellectual Property Office, the disclosure of which is incorporated herein by reference in its entirety.

BACKGROUND OF THE INVENTION

1. Field of the Invention

The present invention relates to a light reflective resin film and a method of manufacturing the same, and more particularly, to a light reflective resin film which includes a plurality of resin layers and a method of manufacturing the light reflective resin film.

2. Description of the Related Art

Polymer films are widely used for applications such as an electronic, chemical, food, medicine, construction, and packaging materials. For example, in the case of a decorative polymer film having a specific color, a colorant may be utilized, or a method of reflecting or shielding light having a specific wavelength may be used.

For example, a light reflective film which can selectively reflect light having a specific wavelength region, such as an infrared reflective film, a visible light reflective film, a reflective polarizing film, and the like may be manufactured by repeatedly and alternately laminating resin layers having different refractive indices from each other.

However, when laminating the plurality of resin layers together, adhesion failure between the respective resin layers may occur. For example, as the resin layers are adhered through a coextrusion, or casting process, etc., optical defects such as an uneven pattern, band pattern, or the like may be caused by a fluctuation in optical characteristics.

Therefore, it is necessary to develop a composition or process for manufacturing a light reflective resin film to improve optical reliability while maintaining light reflection characteristics of the desired wavelength through a difference in the refractive index.

For example, Korean Patent Laid-Open Publication No. 2003-0012874 discloses an infrared reflective film having a multi-layered structure.

PRIOR ART DOCUMENT

Patent Document

Korean Patent Laid-Open Publication No. 2003-0012874

SUMMARY OF THE INVENTION

Accordingly, an object according to exemplary embodiments of the present invention is to provide a light reflective resin film having improved optical characteristics with process stability, and a method for manufacturing the same.

To achieve the above objects, according to an aspect of the present invention, there is provided a light reflective resin film including: a reflective stack which includes a resin layer, wherein the resin layer has a melting resistance of 2,000 MΩ or less, and the melting resistance is measured by bringing a copper plate into contact with the resin layer in a molten film state and applying a voltage of 50 V to the copper plate.

In some embodiments, the reflective stack may include first resin layers and second resin layers repeatedly and alternately laminated, and the first resin layer may have a higher refractive index than the refractive index of the second resin layer.

In some embodiments, each of the first resin layer and the second resin layer may have a melting resistance of 2,000 MΩ or less.

In some embodiments, each of the first resin layer and the second resin layer may have a melting resistance of 50 to 500 MΩ.

In some embodiments, the first resin layer and the second resin layer may satisfy an F-ratio which is defined by Equation 1 below and is in a range of 0.35 to 0.65:

$$\text{F-ratio}=n_1d_1/(n_1d_1+n_2d_2) \quad \text{[Equations 1]}$$

(In Equation 1, $n_1$ and $n_2$ are the refractive indices of the first resin layer and the second resin layer, respectively, and $d_1$ and $d_2$ are thicknesses of the first resin layer and the second resin layer, respectively).

In some embodiments, the first resin layer may include polyethylene terephthalate (PET), and the second resin layer may include polymethyl methacrylate (PMMA). The melting resistance of the first resin layer may be measured at 280° C. and the melting resistance of the second resin layer may be measured at 240° C.

In some embodiments, each of the first resin layer and the second resin layer may include a resistance adjuster including an alkali metal salt or an alkaline earth metal salt.

In some embodiments, the light reflective resin film may further include a first protective layer and a second protective layer respectively laminated on an upper surface and a lower surface of the reflective stack.

In addition, according to another aspect of the present invention, there is provided a light reflective resin film including: a reflective stack which includes first resin layers including a first polymer and second resin layers including a second polymer, which are repeatedly and alternately laminated, wherein the second resin layer has a lower refractive index than the refractive index of the first resin layer, and the second polymer satisfies Equation 3 below:

$$\text{Weight average molecular weight (Mw)}=\alpha\times\text{melt flow index (MFI) value}+\beta \quad \text{[Equation 3]}$$

(In Equation 3, $\alpha$ is in a range of −8,800 to −8,100, $\beta$ is 260,000, and the MFI value is a value obtained by removing a unit expressed in g/min from the measured MFI).

In some embodiments, a difference in a glass transition temperature (Tg) between the second polymer and the first polymer may be 15° C. or lower.

In some embodiments, the second polymer may have a greater glass transition temperature than the glass transition temperature the first polymer, and the second polymer may have a glass transition temperature of 80 to 100° C.

In some embodiments, the second polymer may have a weight average molecular weight (Mw) of 100,000 or more.

In some embodiments, the first polymer may have a weight average molecular weight (Mw) in a range of 30,000 to 100,000.

In some embodiments, the first polymer may include polyethylene terephthalate (PET) and the second polymer may include polymethylmethacrylate (PMMA).

In some embodiments, the first resin layer and the second resin layer may satisfy an F-ratio which is defined by Equation 1 below and is in a range of 0.35 to 0.65:

$$\text{F-ratio}=n_1d_1/(n_1d_1+n_2d_2) \quad \text{[Equation 1]}$$

(In Equation 1, $n_1$ and $n_2$ are the refractive indices of the first resin layer and the second resin layer, respectively, and $d_1$ and $d_2$ are thicknesses of the first resin layer and the second resin layer, respectively).

In some embodiments, a weight ratio of the first polymer to the second polymer may be 1.7 to 3.

In some embodiments, the light reflective resin film may further include a first protective layer and a second protective layer respectively laminated on an upper surface and a lower surface of the reflective stack.

In some embodiments, a draw ratio of the longitudinal stretching of the reflective stack may be 3.3 times or more.

Further, according to another aspect of the present invention, there is provided a method of manufacturing a light reflective resin film including: preparing a first resin raw material including a first polymer and a first resistance adjuster, and a second resin raw material including a second polymer and a second resistance adjuster; extruding the first resin raw material and the second resin raw material, respectively, to form a preliminary molten laminate which includes first molten films and second molten films alternately and repeatedly disposed; forming a preliminary reflective stack by bringing the preliminary molten laminate into close contact with a casting roller through application of a voltage thereto; and stretching the preliminary reflection stack.

In some embodiments, each of the first molten film and the second molten film may have a melting resistance of 2,000 MΩ or less, and the melting resistance may be measured by placing a copper plate adjacent to each of the first molten film and the second molten film, and applying a voltage of 50 V to the copper plate.

According to the above-described exemplary embodiments, the resin layer included in the light reflective resin film may have a melting resistance value within a predetermined range, thereby having appropriate energization characteristics. Accordingly, for example, uniform adhesion characteristics may be secured in a casting process for forming a resin laminate, thereby preventing an occurrence of optical defects such as a band pattern, uneven pattern or the like.

According to exemplary embodiments, the resin layer may include a base polymer and a resistance adjuster mixed with the base polymer. By adjusting a content of the resistance adjuster, it is possible to control the melting resistance, and prevent the above-described optical defects while suppressing a change in the color of the resin layer, such as a yellowing phenomenon.

In addition, according to another exemplary embodiment, the light reflective resin film may include a first resin layer including a first polymer and a second resin layer including a second polymer. The weight average molecular weight and melt flow index of the second polymer may be adjusted so as to satisfy a predetermined relationship in consideration of consistency with the first resin layer.

Accordingly, stretching process stability and product formation stability of the light reflective resin film may be improved, and inter-layer may be enhanced, such that optical and mechanical defects such as a scratch and a band pattern can be suppressed or reduced.

In some embodiments, a difference in the glass transition temperature between the first polymer and the second polymer is maintained within a predetermined range, such that film forming stability and stretching stability may be further improved.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic cross-sectional view illustrating a light reflective resin film according to exemplary embodiments; and FIGS. 2 and 3 are a schematic view and an enlarged view illustrating a method of manufacturing a light reflective resin film according to exemplary embodiments.

DETAILED DESCRIPTION OF THE INVENTION

According to exemplary embodiments, there are provided a light reflective resin film having improved optical reliability and a method of manufacturing the same.

Hereinafter, embodiments of the present application will be described in detail. In this regard, the present invention may be altered in various ways and have various embodiments, such that specific embodiments will be illustrated in the drawings and described in detail in the present disclosure. However, the present invention is not limited to the specific embodiments, and it will be understood by those skilled in the art that the present invention is to cover all modifications, equivalents, and alternatives falling within the spirit and scope of the present invention.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic cross-sectional view illustrating a light reflective resin film according to exemplary embodiments.

Referring to FIG. 1, a light reflective resin film 100 may include a reflective stack 110 and protective layers 150*a* and 150*b*. According to exemplary embodiments, the reflective stack 110 may include a first resin layer 120 and a second resin layer 130.

The first resin layer 120 and the second resin layer 130 may have different refractive indices from each other. Due to interface reflection caused by a difference in the refractive index between the first resin layer 120 and the second resin layer 130, light reflection from the reflective stack 110 or light shielding performance thereof may be implemented.

In one embodiment, the difference in the refractive index between the first resin layer 120 and the second resin layer 130 may be 0.01 or more, preferably 0.05 or more, and more preferably 0.1 or more.

The first resin layer 120 and the second resin layer 130 may include an appropriate polymer within a range that can maintain the above-described difference in the refractive index.

The first resin layer 120 may include a first polymer having a higher refractive index than that of the second resin layer 130, and may include, for example, a polyester polymer, a polyester copolymer, polynaphthalene and the like. In one embodiment, the first resin layer 120 may include polyethylene terephthalate (PET), polybutylene terephthalate (PBT), polytrimethylene terephthalate (PTT), polyethylene naphthalate (PEN) and the like. In a preferred embodiment, the first resin layer 120 or the first polymer may include polyethylene terephthalate (PET). For example, the first resin layer 120 may have a higher refractive index than that of the second resin layer 130.

For example, the first resin layer 120 may have a refractive index in a range of 1.6 to 1.7, and may have a refractive index in a range of 1.64 to 1.66 when the first resin layer 120 includes PET.

The first resin layer 120 may have birefringence characteristic. As described above, the first resin layer 120 may include PET, and may have a positive birefringence characteristic in which the refractive index is increased according to stretching.

The first resin layer 120 may have a melting temperature of 270° C. or higher, for example. In one embodiment, the first resin layer 120 may have a melting temperature in a range of 270 to 290° C.

In some embodiments, the first polymer may have a glass transition temperature in a range of 75 to 85° C. in consideration of easiness in melting and extrusion processes.

In some embodiments, the first polymer may have a weight average molecular weight (Mw) in a range of about 30,000 to 100,000. Within the above range, film forming stability and stretching stability may be improved. In a preferred embodiment, the first polymer may have a weight average molecular weight in a range of about 40,000 to 80,000.

The second resin layer 130 may include a second polymer having a lower refractive index than that of the first polymer of the first resin layer 120, and may include, for example, an acrylic polymer such as polymethyl methacrylate (PMMA), polystyrene (PS), polyvinyl fluoride (PVF), polyvinylidene fluoride (PVDF), polylactide (PLA) and the like. In a preferred embodiment, the second resin layer 130 may include PMMA. For example, the second resin layer 130 may have a lower refractive index than that of the first resin layer 120.

In some embodiments, the second resin layer 130 may include a copolymer polyester resin. For example, the second resin layer may include a copolymer (co-PET) in which polyethylene terephthalate (PET) is copolymerized with neopentine glycol (NPG), cyclohexanedimethanol (CHDM), and/or syndiotactic polystyrene (SPS).

For example, the refractive index of the second resin layer 130 may be in a range of 1.4 to 1.5, and may have a refractive index in a range of 1.485 to 1.495 when the second resin layer 130 includes PMMA.

The second resin layer 130 may include an isotropic polymer. As described above, the second resin layer 130 may include PMMA whose refractive index is not changed by stretching. In this case, the refractive index of the first resin layer 120 may be increased by stretching, and a difference in the refractive index with the second resin layer 130 may be increased.

The second resin layer 130 may have a melting temperature of 210° C. or higher, for example. In one embodiment, the second resin layer 130 may have a melting temperature in a range of 210 to 240° C.

According to exemplary embodiments, the glass transition temperature (Tg) of the second polymer included in the second resin layer 130 may be adjusted in consideration of easiness of coextrusion with the first polymer including PET and flow stability, for example.

In some embodiments, a difference in the glass transition temperature (Tg) between the second polymer and the first polymer may be 15° C. or lower. In one embodiment, the second polymer may have a glass transition temperature (Tg) of 80 to 100° C. while maintaining the above-described range of the difference in the glass transition temperature.

As shown in FIG. 1, the reflective stack 110 may include first resin layers 120 and second resin layers 130, which are repeatedly and alternately laminated. For example, the number of laminations of the reflective stack 110 may range from 100 to 200. In a preferred embodiment, the number of laminations of the reflective stack 110 may range from 140 to 160.

In some embodiments, the reflective stack 110 may have an F-ratio defined by Equation 1 below, which can be adjusted in a range of 0.35 to 0.65.

$$\text{F-ratio}=n_1d_1/(n_1d_1+n_2d_2) \quad \text{[Equation 1]}$$

In Equation 1, $n_1$ and $n_2$ are the refractive indices of the first resin layer 120 and the second resin layer 130, respectively, and $d_1$ and $d_2$ are thicknesses of the first resin layer 120 and the second resin layer 130, respectively.

Light irradiated to the light reflective resin film 100 forms a primary reflection wavelength at a corresponding wavelength (λ), for example, may form a secondary reflection wavelength at a wavelength of λ/2. If the reflectance at the secondary reflection wavelength is high, light reflection may be excessively increased at a wavelength of undesired band.

When adjusting the F-ratio within the above-described range, the secondary reflection wavelength may be selectively utilized together with the primary reflection wavelength, while suppressing excessive light reflection at the reflection wavelength.

In one embodiment, the f-ratio may be adjusted in a range of 0.45 to 0.55. In this case, the secondary reflection wavelength is substantially removed and only the primary reflection wavelength may be utilized.

The refractive index and thickness of each of the first resin layer 120 and the second resin layer 130 may be appropriately designed according to the desired wavelength of the reflection light while maintaining the above-described F-ratio.

For example, the refractive index and thickness of each of the first resin layer 120 and the second resin layer 130 may be determined according to the desired wavelength λ of the shielding light according to Equation 2 below.

$$\lambda=2\ (n_1d_1+n_2d_2) \quad \text{[Equation 2]}$$

In Equation 2, $n_1$ and $n_2$ are the refractive indices of the first resin layer 120 and the second resin layer 130, respectively, and $d_1$ and $d_2$ are the thicknesses of the first resin layer 120 and the second resin layer 130, respectively.

According to exemplary embodiments, the reflective stack 110 may have a melting resistance of 500 MΩ or less. According to exemplary embodiments, each of the first resin layer 120 and the second resin layer 130 may have a melting resistance of 2,000 MΩ or less.

When the melting resistances of the first resin layer 120 and the second resin layer 130 exceed 2,000 MΩ, as will be described below with reference to FIG. 2, sufficient energization characteristics may not be implemented in the casting process. Accordingly, adhesion failure of the resin layer to the casting roller may occur, thereby resulting in a band pattern or an uneven pattern in a transverse direction (TD).

In a preferred embodiment, the melting resistances of the first resin layer 120 and the second resin layer 130 may be in a range of 50 to 500 MΩ. Within the above range, reliability in the casting process is improved through uniform energization, and discoloration, for example, yellowing phenomenon of the resin layer due to an increase in the content of the resistance adjuster, which will be described below, may be prevented.

The melting resistance is a resistance value measured after applying a voltage of 50 V to each of the first resin layer 120 and the second resin layer 130, which have a film form in a molten state, with being spaced apart from a copper (Cu) plate at a predetermined distance. For example, the copper plate may have a size of 25 mm wide, 200 mm long, and 2 mm thick. The separation distance between the copper plate and the resin layers may be 30 mm.

When the first resin layer 120 includes PET, the melting resistance of the first resin layer 120 may be measured at 280° C. When the second resin layer 130 includes PMMA, the melting resistance of the second resin layer 130 may be measured at 240° C.

According to exemplary embodiments, each of the first resin layer 120 and the second resin layer 130 may include a resistance adjuster. In some embodiments, the melting resistance in the above-described range may be implemented by adjusting the content of the resistance adjuster.

The resistance adjuster may include an alkali metal salt or an alkaline earth metal salt. For example, the resistance adjuster may include an inorganic salt such as potassium halide, magnesium halide, potassium hydroxide, magnesium hydroxide, and the like, or an organic salt such as potassium acetate, magnesium acetate and the like. These may be used alone or in combination of two or more thereof.

According to some embodiments, in the first resin layer 120, the content of the resistance adjuster based on a total weight of the first polymer such as PET included in the first resin layer 120 may be 10 ppm or more. In a preferred embodiment, the content of the resistance adjuster based on the total weight of the first polymer may be in a range of 50 to 300 ppm, and more preferably 50 to 200 ppm.

According to some embodiments, in the second resin layer 130, the content of the resistance adjuster based on the total weight of the second polymer such as PMMA included in the second resin layer 130 may be 100 ppm or more. In a preferred embodiment, the content of the resistance adjuster based on the total weight of the second polymer may be in a range of 100 to 300 ppm, and more preferably 100 to 200 ppm.

According to another exemplary embodiment, the weight average molecular weight (Mw) and a melt flow index (MFI) of the second polymer included in the second resin layer 130 may be determined in consideration of lamination consistency with the first resin layer 120, and stretching stability.

For example, when the lamination consistency of the second resin layer 130 with the first resin layer 120 is deteriorated, interface delamination in the reflective stack 110 may occur, and rupture or tearing may occur due to a difference in the inter-layer physical property in the stretching process.

In addition, during the extrusion process of the first resin layer 120 and the second resin layer 130, band patterns may occur due to flow mismatch at the interface, and scratches and stains may occur in a roll-to-roll process.

According to exemplary embodiments, the second polymer may satisfy Equation 3 below.

$$\text{Weight average molecular weight (Mw)}=\alpha\times\text{melt flow index (MFI) value}+\beta \quad \text{[Equation 3]}$$

In Equation 3, α is in a range of −8,800 to −8,100, and β is 260,000. The MFI value included in Equation 3 means a value obtained by removing a unit from the measured MFI.

The melt flow index (MFI) included in Equation 3 is measured under conditions of 230° C. and 3.80 kg, and is expressed in g/min unit.

For example, the second polymer may have a weight average molecular weight (Mw) and a melt flow index (MFI) value which have a substantially linear relationship therebetween within a range of α provided as a slope in Equation 3.

When satisfying the relationship defined by Equation 3 above, optical failures and mechanical failures due to the lack of the above-described inter-layer consistency may be effectively suppressed or significantly reduced.

In some embodiments, the second polymer may have a weight average molecular weight of about 100,000 or more, and preferably, in a range of about 100,000 to 200,000.

Referring to FIG. 1 again, a first protective layer 150*a* and a second protective layer 150*b* may be laminated on an upper surface and a lower surface of the reflective stack 110, respectively. For example, the first protective layer 150*a* and the second protective layer 150*b* may include a PET film.

In some embodiments, the reflective stack 110 may have a thickness of about 50 to 70% based on a total thickness of the light reflective resin film 100, and preferably about 50 to 60%. Within the above range, reflection/shielding of light in the desired wavelength band may be effectively implemented without excessively inhibiting film protection through the protective layers 150*a* and 150*b* and light transmittance of the light reflective resin film 100.

FIGS. 2 and 3 are a schematic view and an enlarged view illustrating a method of manufacturing a light reflective resin film according to exemplary embodiments.

Referring to FIG. 2, a resin raw material 50 may be melted and extruded through an extruder 60. The resin raw material 50 may include a first resin raw material including the above-described first polymer, and a second resin raw material including the above-described second polymer, respectively.

According to exemplary embodiments, the first resin raw material and the second resin raw material may further include a resistance adjuster, respectively.

The first resin raw material and the second resin raw material may be prepared in a form of pellets or chips, and then supplied into the extruder 60, respectively. According to exemplary embodiments, a weight ratio or extrusion ratio of the first resin raw material to the second resin raw material may be 1.7 to 3. Within the above range, it is possible to prevent an occurrence of wavy patterns and film deformation caused by interfacial flow due to a difference in the viscosity between the first polymer and the second polymer.

In a preferred embodiment, the weight ratio or extrusion ratio may be in a range of 2 to 2.7.

The resin raw material 50 may be melted and extruded through the extruder 60, and then transferred through a transfer line 70. Thereafter, the resin raw material 50 may be discharged in the form of a molten film through an extrusion die 80.

Referring to FIG. 3, the first resin raw material and the second resin raw material may be transferred/supplied through a first transfer line 72 and a second transfer line 74, respectively. Then, a first molten film produced from the first resin raw material and a second molten film produced from the second resin raw material may be discharged from a first extrusion die 82 and a second extrusion die 84, which are respectively connected to the first transfer line 72 and the second transfer line 74.

The first extrusion dies 82 and the second extrusion dies 84 may be arranged alternately and repeatedly. Accordingly, the first molten films and the second molten films may be alternately and repeatedly discharged to obtain a preliminary molten laminate.

Referring to FIG. 2 again, the preliminary molten laminate discharged from the extrusion die 80 may be supplied to a casting roller 90.

According to exemplary embodiments, an electrostatic application unit 85 may be disposed adjacent to the casting roller 90. For example, an electrostatic application unit 85 may be disposed to face the casting roller 90 with the preliminary molten laminate interposed therebetween. The electrostatic application unit 85 may include a copper wire, a metal wire such as a copper plate, or a metal plate connected to a power source.

When a voltage is applied to the electrostatic application unit 85 from the power source, a negative charge may be induced in the casting roller 90, and the preliminary molten laminate may be adhered closely to the roller 90 by the resistance adjusters contained in the first molten film and the second molten film.

As described above, each of the first molten film and the second molten film may have a melting resistance of 2,000 MΩ or less, and preferably in a range of 50 to 500 MΩ. Therefore, when performing the energization or electrostatic application, adhesion through electrical attraction close to the casting roller 90 may be promoted, and optical defects due to insufficient energization may be prevented.

In some embodiments, a temperature of the casting roller 90 may be maintained at a temperature of room temperature or lower. Thereby, the preliminary molten laminate may be solidified while adhering closely to the casting roller 90 by the above-described energization to form a preliminary reflective stack.

The preliminary reflective stack may be transferred while being tensioned through a tensioner 95.

Thereafter, the preliminary reflective stack may be subjected to a stretching process using a drawing roller 110 to obtain the reflective stack 110. As shown in FIG. 1, the first protective layer 150*a* and the second protective layer 150*b* are laminated on the upper surface and the lower surface of the reflective stack 110, respectively, to manufacture the light reflective resin film 100. In one embodiment, after the lamination of the first protective layer 150*a* and the second protective layer 150*b*, the stretching process may be performed.

The stretching process may include stretching in the MD direction (e.g., longitudinal stretching) and stretching in the TD direction (e.g., transverse stretching). For example, a draw ratio of the longitudinal stretching may be 3.3 times or more. Even in this case, tearing and rupture of the film may be suppressed in the transverse stretching after the longitudinal stretching, and stable tensile strength may be maintained.

According to the above-described exemplary embodiments, the first resin raw material may include, for example, PET, and the second resin raw material may be obtained from the second polymer in which the weight average molecular weight and the melt flow index are adjusted as described above, and a difference in the glass transition temperature with the first resin raw material is adjusted to a predetermined temperature or lower.

Accordingly, an occurrence of unwanted patterns due to non-uniform flow when forming the preliminary molten laminate may be suppressed. In addition, adhesion stability is further enhanced on the casting roller 90, and scratches, roll marks, etc. caused by the casting roller 90 and the tensioner 95 may be prevented.

In addition, the lamination stability of the reflective stack 110 is improved, such that the stretching process may stably performed, and thereby further increasing the draw ratio.

Hereinafter, embodiments of the present invention will be further described with reference to specific experimental examples. However, the following examples and comparative examples included in the experimental examples are only given for illustrating the present invention and those skilled in the art will obviously understand that various alterations and modifications are possible within the scope and spirit of the present invention. Such alterations and modifications are duly included in the appended claims.

EXPERIMENTAL EXAMPLE 1

(1) Examples 1 to 8 and Comparative Examples 1 to 4

A first resin raw material (including a first polymer and a first resistance adjuster) and a second resin raw material (including a second polymer and a second resistance adjuster) in a form of pellets with the compositions and contents described in Table 1 were melted and extruded through an extruder, respectively, then the first molten film and the second molten film were alternately and repeatedly supplied through feed block dies including extrusion dies to form a preliminary molten laminate of 143 layers in total.

A melting and extrusion temperature of the first resin raw material was maintained at 280° C., and a melting and extrusion temperature of the second resin raw material was maintained at 240° C. The weight ratio of the first resin raw material and the second resin raw material was maintained at 2:1.

Then, as described above with reference to FIG. 2, a casting process was performed by supplying the preliminary molten laminate between a casting roller adjusted to 20° C. and a copper wire, and applying a voltage to the copper wire.

Thereafter, the preliminary molten laminate adhered closely to and solidified by the casting roller was drawn using a tension roller to form a reflective stack including first resin layers and second resin layers alternately and repeatedly laminated therein. The first resin layer was formed to have a thickness of 140 nm, and the second resin layer was formed to have a thickness of 155 nm.

A PET resin was applied to an upper surface and a lower surface of the reflective stack to form a protective layer, then the stack was subjected to longitudinal stretching at a draw ratio of 3.5 times and transverse stretching at a draw ratio of 4.5 times to manufacture a light reflective resin film.

TABLE 1

| Section | | Example 1 | Example 2 | Example 3 | Example 4 |
|---|---|---|---|---|---|
| First polymer | | PET | PET | PET | PET |
| Second polymer | | PMMA | co-PET (comonomer NPG) | co-PET (comonomer CHDM) | |
| First resistance adjuster (Content based on first polymer) (ppm) | Mg acetate | 100 | 100 | 100 | 100 |
| | K acetate | 5 | 5 | 5 | 5 |
| Second resistance adjuster (Content based on second polymer) (ppm) | Mg acetate | 150 | 150 | 150 | — |
| | K acetate | 10 | 5 | 5 | — |

TABLE 2

| Section | | Example 5 | Example 6 | Example 7 | Example 8 |
|---|---|---|---|---|---|
| First polymer | | PET | PET | PET | PET |
| Second polymer | | PMMA | PMMA | PMMA | PMMA |
| First resistance adjuster (Content based on first polymer) (ppm) | Mg acetate | 100 | 60 | 100 | 100 |
| | K acetate | 5 | 5 | 5 | 5 |
| Second resistance adjuster (Content based on second polymer) (ppm) | Mg acetate | 200 | 130 | 150 | 100 |
| | K acetate | 10 | 5 | 5 | 5 |

TABLE 3

| Section | | Comparative Example 1 | Comparative Example 2 | Comparative Example 3 | Comparative Example 4 |
|---|---|---|---|---|---|
| First polymer | | PET | PET | PET | PET |
| Second polymer | | PMMA | co-PET (comonomer NPG) | co-PET (comonomer CHDM) | |
| First resistance adjuster (Content based on first polymer) (ppm) | Mg acetate | 100 | 100 | 100 | 100 |
| | K acetate | 5 | 5 | 5 | 10 |
| Second resistance adjuster (Content based on second polymer) (ppm) | Mg acetate | — | — | — | — |
| | K acetate | — | — | — | — |

(2) Evaluation Example

1) Measurement of Melting Resistance

The first molten film and the second molten film made of each of the first resin raw material and the second resin raw material were placed on a copper plate, and a voltage of 50 V was applied to the copper plate. Then, resistance values in the first molten film and the second molten film were measured. As described above, the resistance measurement temperature of the first molten film was 280° C., and the resistance measurement temperature of the second molten film was 240° C.

2) Evaluation of Pattern Occurrence in the TD Direction

The light reflective resin films manufactured according to the examples and comparative examples were observed by visually for visual determination and a polarization apparatus (model name: LSM-401, manufactured by LUCEO) to evaluate whether an uneven pattern occurs in the TD direction.

Standards for evaluation are as follows.

o: Any pattern was not viewed by both the visual determination and polarization apparatus Δ: Any pattern was not viewed by visual determination, but patterns viewed by the polarization apparatus x: Patterns viewed by both the visual determination and polarization apparatus Results of the evaluation are as described in Tables 4 and 5 below.

TABLE 4

| Section | | Example 1 | Example 2 | Example 3 | Example 4 | Example 5 | Example 6 |
|---|---|---|---|---|---|---|---|
| Melting resistance (MΩ) | First resin layer (First molten film) | 111 | 111 | 111 | 111 | 111 | 550 |
| | Second resin layer (Second molten film) | 119 | 308 | 414 | | 48 | 530 |
| Uneven pattern in TD | | ○ | ○ | ○ | ○ | ○ | Δ |

TABLE 5

| Section | | Example 7 | Example 8 | Comparative Example 1 | Comparative Example 2 | Comparative Example 3 | Comparative Example 4 |
|---|---|---|---|---|---|---|---|
| Melting resistance (MΩ) | First resin layer (First molten film) | 111 | 111 | 111 | 111 | 111 | 2141 |
| | Second resin layer (Second molten film) | 742 | 1453 | 3418 | 4306 | 2013 | |
| Uneven pattern in TD | | Δ | Δ | x | x | x | x |

Referring to Tables 4 and 5, in the case of the comparative examples in which the melting resistance of the first resin layer or the second resin layer exceeds 2000 MΩ, patterns in the TD direction were visually observed.

On the other hand, in the case of the Examples 1 to 5 in which the melting resistance of both the first resin layer and the second resin layer was 500 MΩ or less, any pattern in the TD direction was not observed by both the visual determination and polarization apparatus.

However, in the case of Example 5 in which the melting resistance of the second resin layer was excessively decreased, discoloration phenomenon of the second resin layer was observed as the content of the resistance adjuster was excessively increased.

EXPERIMENTAL EXAMPLE 2

(1) Examples 9 to 14 and Comparative Examples 5 and 6

1) Example 9 i) Preparation of First Polymer (PET)

A slurry prepared by mixing 358 parts by weight ('wt. parts') of high purity terephthalic acid per unit time and 190 wt. parts of ethylene glycol per unit time was continuously supplied into a reactor maintained under conditions of 274.5° C. and atmospheric pressure in a nitrogen atmosphere. While removing water and ethylene glycol generated in an esterification reaction out of the reactor by distillation, the esterification reaction was completed at a theoretical staying time of 4 hours in the reactor.

450 wt. parts of the ethylene terephthalate oligomer formed in the esterification reaction was sequentially transferred to a polycondensation reaction tank. The reaction temperature and reaction pressure in the polycondensation reaction tank were maintained at 276.5° C. and 60 Pa, respectively, and a polycondensation reaction was performed in a molten state for a staying time of 180 minutes while removing the water and ethylene glycol generated in the polycondensation reaction out of the polycondensation reaction tank, thus to obtain a polyethylene terephthalate (PET) resin as the first polymer.

ii) Preparation of Second Polymer (PMMA)

Based on 100 wt. parts of a monomer mixture, 96 wt. parts of methyl methacrylate, 4 wt. parts of methyl acrylate, 0.1 wt. parts of 2,2'-azobis(2,4-dimethyl-valeronitrile as an initiator, 0.03 wt. parts of 1,1,3,3-tetramethylbutyl peroxy 2-ethylhexanoate, 133 wt. parts of water, 0.82 wt. parts of an aqueous solution, in which a copolymer of methyl methacrylate-methacrylic acid is saponified with NaOH, as a suspension, 0.098 wt. parts of sodium dihydrogen phosphate as a buffer salt, 0.053 wt. parts of disodium hydrogen phosphate, and 0.33 wt. parts of normal octyl mercaptan as a chain transfer agent were polymerized at an initial reaction temperature set to be 60° C. for 120 minutes.

Thereafter, the temperature was increased to 105° C. for 50 minutes, and polymerization was additionally performed for 40 minutes to obtain polymethyl methacrylate (PMMA) as the second polymer.

iii) Manufacture of Light Reflective Resin Film

The first resin raw material including the first polymer and the second resin raw material including the second polymer in the form of pellets were melted and extruded through an extruder, respectively, then the first molten films and the second molten films were alternately and repeatedly supplied through the feed block dies including the extrusion dies to form a preliminary molten laminate of 143 layers in total.

The melting and extrusion temperature of the first resin raw material was maintained at 280° C., and the melting and extrusion temperature of the second resin raw material was maintained at 240° C. The weight ratio of the first resin raw material and the second resin raw material was maintained at 2:1.

Then, as described above with reference to FIG. 2, a casting process was performed by supplying the preliminary molten laminate between a casting roller adjusted to 20° C. and a copper wire, and applying a voltage to the copper wire.

Thereafter, the preliminary molten laminate adhered closely to and solidified by the casting roller was drawn using a tension roller to form a reflective stack including first resin layers and second resin layers alternately and repeatedly laminated therein. The first resin layer was formed to have a thickness of 140 nm, and the second resin layer was formed to have a thickness of 155 nm.

2) Example 10

A light reflective resin film was manufactured according to the same procedures as described in Example 9, except that the content of the chain transfer agent during the manufacturing process of the second polymer (PMMA) was adjusted to 0.25 wt. parts.

3) Example 11

A light reflective resin film was manufactured according to the same procedures as described in Example 9, except that the additional polymerization time was adjusted to 30 minutes during the manufacturing process of the second polymer (PMMA).

4) Example 12

A light reflective resin film was manufactured according to the same procedures as described in Example 9, except that the additional polymerization time was adjusted to 30 minutes during the manufacturing process of the second polymer (PMMA) and the additional polymerization temperature was adjusted to 95° C.

5) Example 13

A light reflective resin film was manufactured according to the same procedures as described in Example 12, except that the polycondensation time was increased to 300 minutes during the manufacturing process of the first polymer (PET).

6) Example 14

A light reflective resin film was manufactured according to the same procedures as described in Example 12, except that the polycondensation time was reduced to 150 minutes during the manufacturing process of the first polymer (PET).

7) Comparative Example 5

A light reflective resin film was manufactured according to the same procedures as described in Example 9, except that the content of the chain transfer agent was adjusted to 0.25 wt. parts during the manufacturing process of the second polymer (PMMA) and the additional polymerization time was adjusted to 30 minutes.

8) Comparative Example 6

A light reflective resin film was manufactured according to the same procedures as described in Example 9, except that the additional polymerization time was adjusted to 20 minutes during the manufacturing process of the second polymer (PMMA).

Physical properties of the first polymer (PET) and the second polymer (PMMA) of the examples and comparative examples are shown in Tables 6 and 7 below.

Specifically, a glass transition temperature was measured using DSC Q-2000 manufactured by TA Instruments, and a weight average molecular weight (Mw) was measured using gel permeation chromatography (GPC) (PL-GPC220 (Agilent)) and polystyrene standards.

A melt flow index (MFI) was measured according to ASTM D1238 (measurement temperature: 230° C., load: 3.80 kg).

In addition, α values of the second polymer were respectively calculated according to Equation 3 as described above.

TABLE 6

| Section | | Example 9 | Example 10 | Example 11 | Example 12 |
|---|---|---|---|---|---|
| First polymer (PET) | Tg (° C.) | 78.1 | 78.1 | 78.1 | 78.1 |
| | Mw | 48,650 | 48,650 | 48,650 | 48,650 |
| Second polymer (PMMA) | Tg (° C.) | 76.3 | 75.1 | 84.8 | 91.3 |
| | Mw | 186,000 | 195,000 | 120,000 | 101,000 |
| | MFI (g/min) | 8.8 | 7.6 | 17.1 | 18.4 |
| | α | −8,409.1 | −8,553.6 | −8,187.1 | −8,641.3 |

TABLE 7

| Section | | Example 13 | Example 14 | Comparative Example 5 | Comparative Example 6 |
|---|---|---|---|---|---|
| First polymer (PET) | Tg (° C.) | 80.8 | 76.6 | 78.1 | 78.1 |
| | Mw | 61,500 | 45,000 | 48,650 | 48,650 |
| Second polymer (PMMA) | Tg (° C.) | 91.3 | 91.3 | 95.7 | 99.6 |
| | Mw | 101,000 | 101,000 | 87,000 | 95,000 |
| | MFI (g/min) | 18.4 | 18.4 | 23.3 | 12.3 |
| | α | −8,641.3 | −8,641.3 | −7,424.9 | −13,414.6 |

(2) Evaluation Example

1) Evaluation of Rupture Property

A PET resin was applied to an upper surface and a lower surface of the reflective stack to form a protective layer, then the stack was subjected to longitudinal stretching at a draw ratio of 3.5 times and transverse stretching at a draw ratio of 5.5 times to manufacture a light reflective resin film. The manufactured resin film was observed to evaluate whether a rupture occurs during the biaxial stretching process as follows.

Standards for Evaluation of Rupture Property o: Rupture does not occurred x: Rupture occurred in at least one layer 2) Measurement of Film Tensile Strength Tensile strengths of the reflective stacks prepared according to the above-described examples and comparative examples were measured using a JIS B 7721 tensile tester.

3) Evaluation of Stretching Performance in MD

The reflective stacks prepared according to the above-described examples and comparative examples were stretched in the MD direction to measure a ratio of a length in MD of the stack stretched up to the ruptured point based on an initial length in MD of the stack.

Standards for Evaluation of Stretching Performance in MD o: Capable of being stretched exceeding 3.3 times based on the initial length Δ: Capable of being stretched 3.1 times to 3.3 times based on the initial length x: Capable of being stretched less than 3.1 times based on the initial length.

4) Evaluation of Post-Workability

The reflective stacks manufactured according to the above-described examples and comparative examples were weaved (subjected to post-working) in a form of threads having a diameter of 0.254 mm or more using micro slitting equipment, and the workability was evaluated based on the following standards.

Standards for Evaluation of Post-Workability o: Any thread/film rupture or tearing phenomenon was not observed during weaving x: Thread/film rupture or tearing phenomenon was observed during weaving 5) Determination of Pattern Occurrence The reflective stacks prepared according to the above-described examples and comparative examples were visually observed to determine whether a band pattern or a wavy pattern occurred (o: no pattern observed, x: pattern observed)

Results of the evaluation are shown in Table 8 below.

TABLE 8

| Section | Example 9 | Example 10 | Example 11 | Example 12 | Example 13 | Example 14 | Comparative Example 5 | Comparative Example 6 |
|---|---|---|---|---|---|---|---|---|
| Difference in glass transition temperature ΔTg (° C.) {Tg (PMMA) − Tg (PET)} | 1.8 | 3.0 | 6.7 | 13.2 | 13.2 | 14.7 | 17.6 | 21.5 |
| Rupture property | ○ | ○ | ○ | ○ | ○ | ○ | X | X |
| Film tensile strength (kgf/mm$^2$) | 18.8 | 19.2 | 18.3 | 18.2 | 18.5 | 17.9 | 14.7 | 16.5 |
| Stretching performance in MD | ○ | ○ | ○ | ○ | ○ | ○ | X | Δ |
| Post-workability | ○ | ○ | ○ | ○ | ○ | ○ | X | X |
| Pattern occured | ○ | ○ | ○ | ○ | ○ | ○ | X | X |

Referring to Tables 6 to 8, as compared to Comparative Examples 5 and 6 in which ΔTg exceeds 15° C. Mw of PMMA is less than 100,000, and a value is out of the range defined in Equation 1, the reflective stacks or light reflective resin films manufactured according to Examples 9 to 14 provided the improved rupture properties, high film tensile strength, good stretching performance in MD and post-workability.

In addition, in the case of the comparative examples, interfacial flowability between the first resin layer and the second resin layer was reduced, such that band patterns or wavy patterns were visually observed.

DESCRIPTION OF REFERENCE NUMERALS

50: Resin raw material
60: Extruder
70: Transfer line
80: Extrusion die
85: Electrostatic application unit
90: Casting roller
100: Light reflective resin film
110: Reflection stack
120: First resin layer
130: Second resin layer
150*a:* First protective layer
150*b:* Second protective layer

What is claimed is:

1. A light reflective resin film comprising:

a reflective stack comprising a first resin layer and a second resin layer repeatedly and alternately laminated, wherein each of the first resin layer and the second resin layer has a melting resistance of 2,000 MΩ or less, wherein the melting resistance is a resistance value measured by bringing a copper plate into contact with the resin layer in a molten film state and applying a voltage of 50 V to the copper plate, wherein the melting resistance of the first resin layer is measured at a temperature of 280° C. and the melting resistance of the second resin layer is measured at a temperature of 240° C., wherein each of the first resin layer and the second resin layer comprises a resistance adjuster including an alkali metal salt or an alkaline earth metal salt, wherein the first resin layer includes a first polymer having a weight average molecular weight of 30,000 to 100,000, and wherein the second resin layer includes a second polymer having a weight average molecular weight of 100,000 or more, wherein the first resin layer includes polyethylene terephthalate (PET), and the second resin layer includes polymethyl methacrylate (PMMA), and wherein a difference in a glass transition temperature (Tg) between the second polymer and the first polymer is 15° C. or lower.

2. The light reflective resin film according to claim 1, wherein the first resin layer has a higher refractive index than the refractive index of the second resin layer.

3. The light reflective resin film according to claim 2, wherein the first resin layer and the second resin layer satisfy an F-ratio which is defined by Equation 1 below and is in a range of 0.35 to 0.65:

$$\text{F-ratio}=n_1d_1/(n_1d_1+n_2d_2) \quad \text{[Equation 1]}$$

(In Equation 1, $n_1$ and $n_2$ are the refractive indices of the first resin layer and the second resin layer, respectively, and $d_1$ and $d_2$ are thicknesses of the first resin layer and the second resin layer, respectively).

4. The light reflective resin film according to claim 1, wherein each of the first resin layer and the second resin layer has the melting resistance of 50 to 500 MΩ.

5. The light reflective resin film according to claim 1, further comprising a first protective layer and a second protective layer respectively laminated on an upper surface and a lower surface of the reflective stack.

* * * * *